United States Patent [19]
Day

[11] Patent Number: 6,039,518
[45] Date of Patent: Mar. 21, 2000

[54] SURFACE REFERENCED DEPTH CONTROL

[76] Inventor: Michael E. Day, 2315—B Forest Dr., Suite 35, Annapolis, Md. 21401

[21] Appl. No.: 08/815,426

[22] Filed: Mar. 11, 1997

[51] Int. Cl.[7] .................................................. B23B 49/00
[52] U.S. Cl. .............................. 409/218; 408/14; 408/97; 408/241 S
[58] Field of Search ............................. 408/5, 7, 14, 95, 408/97, 241 S; 409/218

[56] References Cited

U.S. PATENT DOCUMENTS

| | | | |
|---|---|---|---|
| 4,330,052 | 5/1982 | Schymick | 408/14 |
| 4,749,314 | 6/1988 | Leblond | 408/95 |
| 4,909,683 | 3/1990 | Vershowske et al. | 408/14 |
| 5,087,156 | 2/1992 | Kanaya et al. | 408/97 |
| 5,127,775 | 7/1992 | Broadbent et al. | 408/14 |
| 5,286,147 | 2/1994 | Escobedo et al. | 408/14 |
| 5,308,198 | 5/1994 | Pumphrey | 408/95 |

*Primary Examiner*—Daniel W. Howell
*Attorney, Agent, or Firm*—Lawrence Douglas Bush

[57] ABSTRACT

The subject invention controls the penetration of a drill or router into a cutting surface by preventing excessive downward travel by a spindle once a preset depth is reached. This is achieved by placing a mechanical stop on the pressure foot linkage and providing a compression means to absorb the excessive downward travel. The compression can be absorbed within the select cylinder volume by reducing operating pressure appropriately, or within an added compression cylinder, or by a compression spring.

10 Claims, 4 Drawing Sheets

SURFACE REFERENCED DEPTH CONTROL

This patent application relates to controls for limiting the depth of penetration for drills and routers. An invention disclosure concerning this application was filed with the U.S. Patent and Trademark Office in November, 1996.

BACKGROUND—DESCRIPTION OF PRIOR ART

This invention involves an apparatus which attaches to a spindle assembly and controls the depth of penetration of a drill or router relative to the pressure foot. Because the pressure foot rests on the cutting surface, the depth of penetration by a drill or router into the cutting surface is also controlled. The present invention stops the penetration without stopping the vertical, known as the Z-axis, drive by providing a means for compression of the spindle assembly that internally absorbs the excess travel along the Z-axis.

One typical configuration for a spindle assembly includes a top-mounted cylinder and piston that raises and lowers the spindle assembly. The common names for these are the "select cylinder" and "select cylinder piston". The cylinder may be filled with air or hydraulic fluid. Air or hydraulic pressure is applied to the lower side of the piston to lift the spindle assembly from the cutting surface. Likewise, pressure is applied to the upper side of the piston when the spindle assembly is placed into operating position against the cutting surface. Usually, air pressure during operation of the spindle is maintained between 50 psi and 80 psi.

Once the cutting process begins, the drill or router on the spindle is driven into the cutting surface by externally applied force along the vertical or Z-axis. Control of the depth of penetration into the cutting surface is important for precision work, such as making circuit boards. Except in very expensive spindle assemblies, the depth is controlled only by setting the distance of travel for the Z-drive.

The present invention addresses the problem of maintaining a constant depth of penetration by adding three features to the typical spindle assembly. First, a scalar measuring device, such as a micrometer, is attached to the spindle to provide a reference measurement between the spindle and the pressure foot. This measurement thereby sets the limit or depth to which the drill or router may penetrate. Second, a mechanical stop is attached to the pressure foot linkage, so as to prevent the spindle from penetrating beyond the preset depth. Third, a pressure regulator is attached to the air (or hydraulic) system for the select cylinder to reduce the pressure inside the select cylinder and thereby allow compression by the select cylinder piston. In lieu of this pressure regulator, a compression cylinder or spring can be attached anywhere between the spindle and the Z-drive to provide for the needed means to absorb excessive downward travel. Working together, these improvements allow the Z-drive to operate normally while maintaining a constant depth of penetration relative to the cutting surface, as referenced to the pressure foot.

Some spindle assemblies are configured without a select cylinder and piston, so that the Z-drive is attached directly to the top of the spindle. In such cases, a compression cylinder and piston can be mounted anywhere between the spindle and the Z-drive. It should also be noted that an alternate means for compression, such as a spring, can be utilized to accomplish the same purpose.

In spindle assemblies that feature a locking device that secures the spindle and pressure foot together, the locking device must be disabled. One way of doing this is to install a switch. This switch can be further linked to the mechanical stop so that the locking device is automatically disabled when the mechanical stop is in position for use.

Likewise, to automate the reduction of pressure in the select cylinder, a switch can be linked to the mechanical stop to engage the pressure regulator when the mechanical stop is in position for use.

The primary advantage of the present invention is the increased precision for depth tolerances that is gained by modifying existing types of spindle assemblies. Another advantage is that the present invention can be installed in machines already in service without limiting their performance capabilities. Also, the present invention can be added to new spindle assemblies during the manufacturing process. Another advantage is that the improved depth control generates less scrap material during drilling and routing processes. Cutting tool life can be extended by elimination of excessive drilling and routing. Still another advantage is the increased ease of setting the desired depth of penetration into a cutting surface. When the cutting task is repetitive, setup time is reduced because the depth measurement does not have to be reset for each cutting surface. More advantages will be obvious from a further review of the drawings and specifications contained herein.

The present invention differs from depth controls previously disclosed in U.S. Pat. No. 4,530,625 (which provides for a hydraulic stop and override system), U.S. Pat. No. 4,436,460 (which compensates for depth by a sensor activated motor drive), and U.S. Pat. No. 5,123,789 (which places controls on the Z-drive).

PREFERRED EMBODIMENT OF THE INVENTION

Figures 1A, 1B:
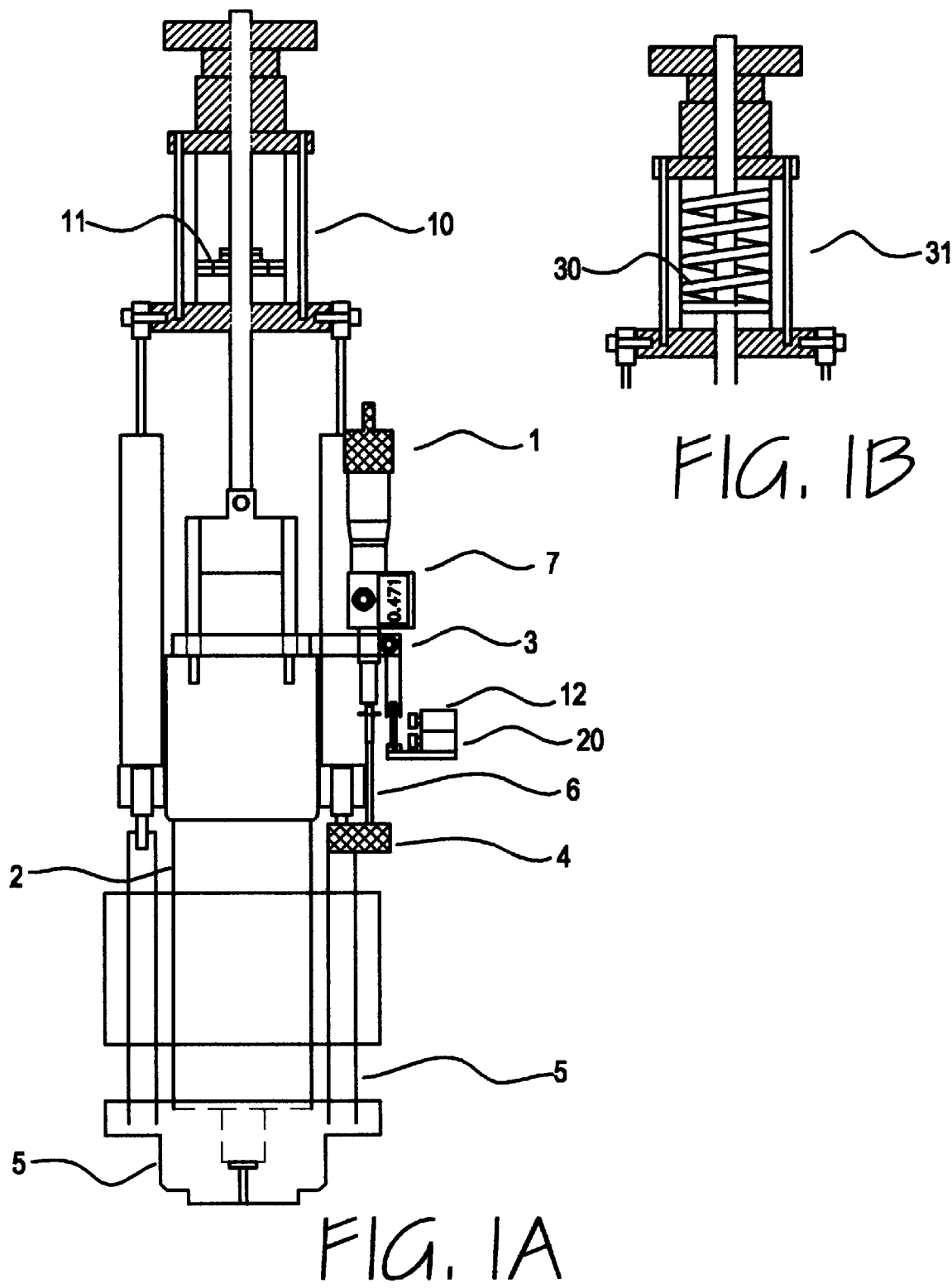
FIG. 1A is a sectional view of a spindle assembly on which the present invention has been installed.
FIG. 1B shows a spring for absorbing excessive downward travel.
Figure 2:
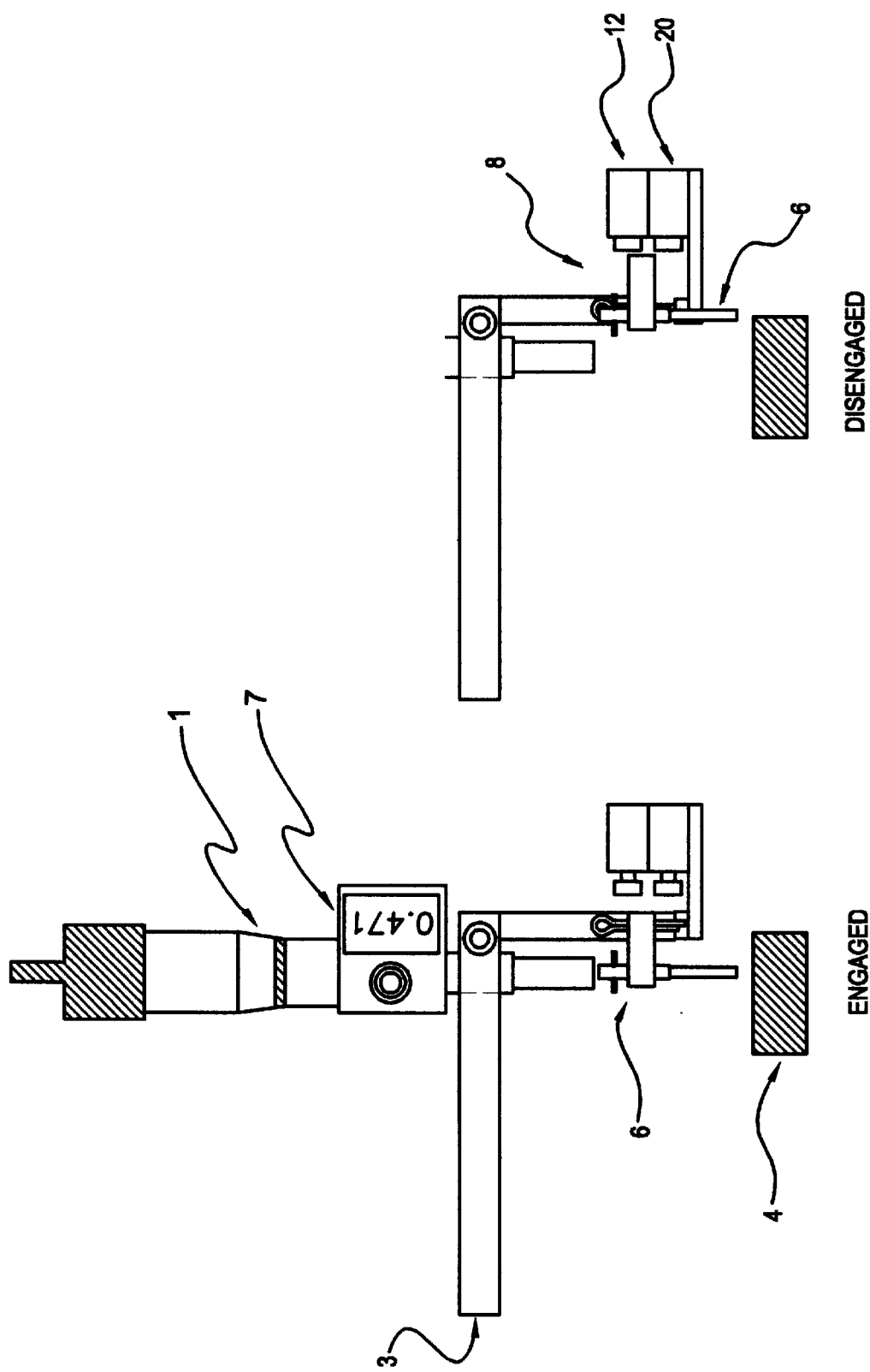
FIG. 2 is a side view of the present invention.

Referring to FIG. 1A, a micrometer 1 is attached to the spindle 2 using a mounting bracket 3. The micrometer 1 includes a digital scale 7 for ease of adjustment. A mechanical stop 4 containing a hinge feature is attached to the pressure foot linkage 5. A spacer pin 6 is attached to the mechanical stop 4 and spans the distance to the end of the micrometer 1. During use, the mechanical stop 4 and spacer pin 6 are locked into position using locking pin 8. The depth of penetration for any cutting tool attached to the spindle 2 is limited by the distance set between the micrometer 1 and the spacer pin 6. When not in use, the spacer pin 6 can be rotated away from the micrometer 1 by means of the hinge feature on the mechanical stop 4.

Figure 3:
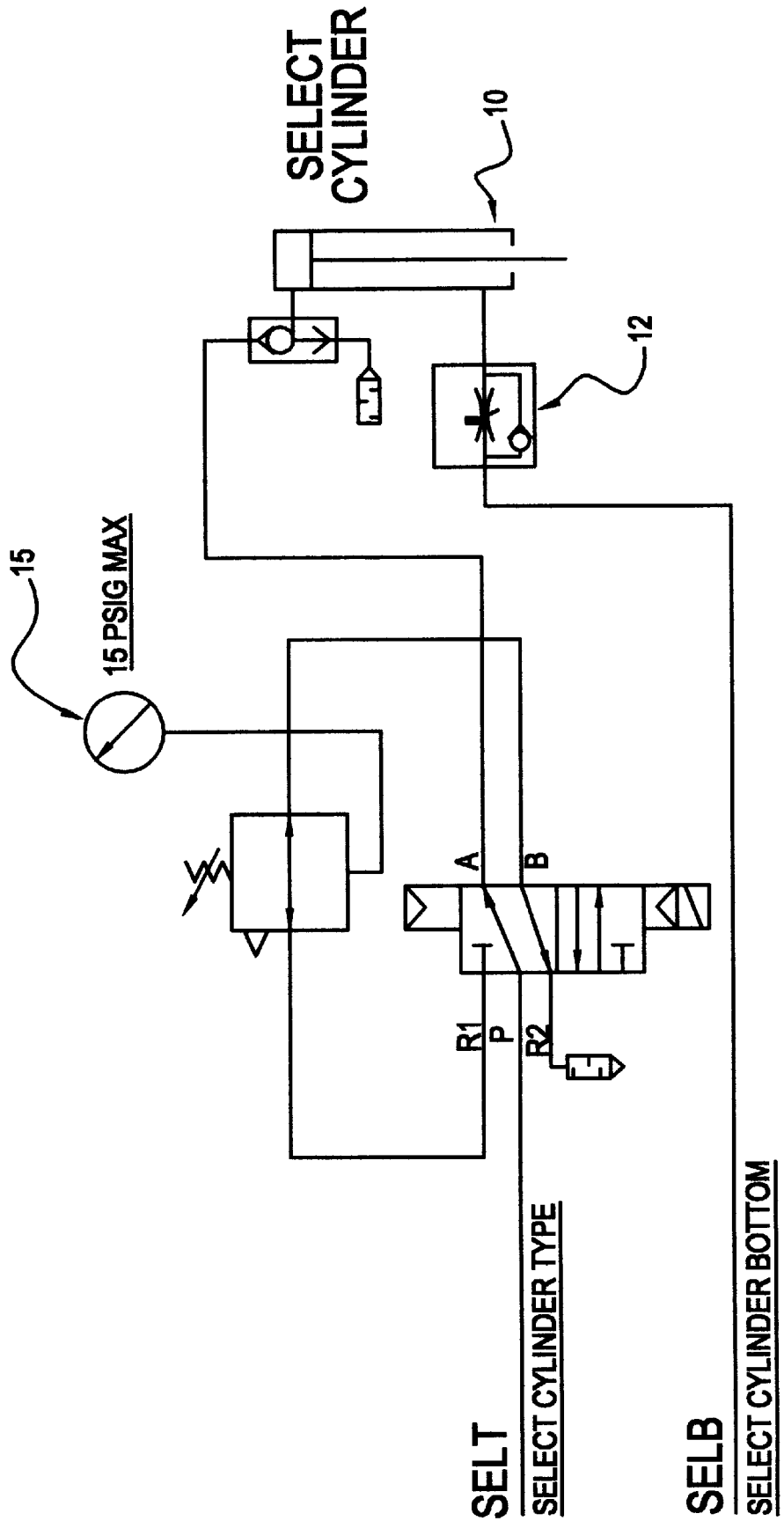
FIG. 3 is a schematic diagram of the pneumatic circuit for the present invention.

To lower the pressure in the select cylinder 10, a pressure regulator 15 is added as shown in FIG. 3. The pressure is lowered in the top of select cylinder 10 to approximately 15 psi so that the select cylinder piston 11 can compress. To activate the pressure regulator 15, a micro switch 12 is attached beside the micrometer 1 and engaged when the spacer pin 6 is in position.

Figure 4:
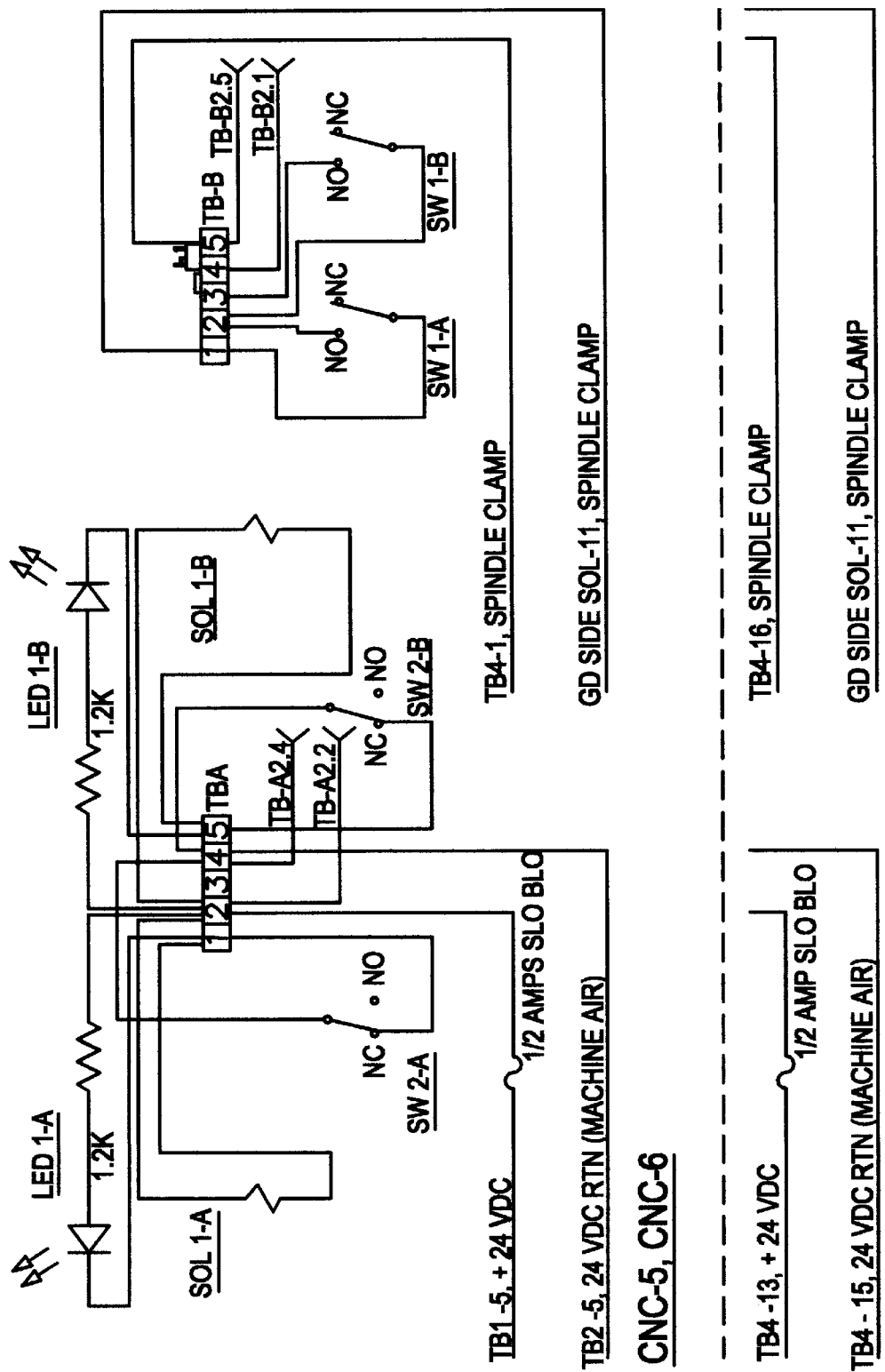
FIG. 4 is a schematic diagram of the electronic circuit for the present invention.

Referring to FIG. 4, another micro switch 20 is similarly attached and engaged to release any locking device that clamps or holds the spindle 2 against the pressure foot linkage 5.

In situations where the select cylinder 10 and the select cylinder piston 11 are not present, these components can be added to the spindle 2. FIG. 1B also shows a spring 30 and cylinder 31 which can be added to spindle 2 as another alternative when the select cylinder 10 and the select cylinder piston 11 are not present.

I claim:

1. An apparatus for depth control of a spindle assembly comprising:
   a. a stop positioned between a pressure foot linkage and the spindle to halt downward travel by the spindle;
   b. a means for setting the distance for travel by the spindle relative to the pressure foot linkage; and
   c. a means for absorbing excessive downward travel applied by a Z-drive to the spindle.

2. An apparatus as described in claim 1, wherein the means for setting the distance for travel by the spindle is a micrometer.

3. An apparatus as described in claim 1, wherein the means for absorbing excessive downward travel applied by the Z-drive is a spring positioned between the spindle and the Z-drive.

4. An apparatus as described in claim 1, wherein the means for absorbing excessive downward travel applied by the Z-drive is an intermediate compression cylinder positioned between the spindle and the Z-drive.

5. An apparatus for depth control of a spindle assembly, when equipped with a select cylinder, comprising:
   a. a stop positioned between a pressure foot linkage and the spindle to halt downward travel by the spindle;
   b. a means for setting the distance for travel by the spindle relative to the pressure foot linkage; and
   c. a means for reducing the pressure in the select cylinder to allow the select cylinder piston to absorb excessive downward travel applied by a Z-drive to the spindle.

6. An apparatus as described in claim 5, wherein the means for reducing pressure is a pressure regulator attached to the top side of the select cylinder.

7. An apparatus as described in claim 5, and further comprising:
   a. a switch for engaging and disengaging the means for reducing pressure in the select cylinder.

8. An apparatus as described in claim 1, and further comprising:
   a. a switch for engaging and disengaging any locking device used to clamp the spindle to the pressure foot linkage.

9. An apparatus as described in claim 1, wherein the stop contains a hinge to allow the stop to be rotated into and out of operating position.

10. An apparatus as described in claim 5, wherein the stop contains a hinge to allow the stop to be rotated into and out of operating position.

* * * * *